United States Patent [19]

Creecy et al.

[11] Patent Number: 5,354,796
[45] Date of Patent: Oct. 11, 1994

[54] LOW GLOSS THERMOPLASTIC MOLDING COMPOSITIONS

[75] Inventors: Oliver P. Creecy, Elizabeth, W. Va.; Richard P. Eckberg, Saratoga Springs, N.Y.; Edward J. Fewkes, Jr., Belpre, Ohio; Vicki H. Watkins, Alplaus, N.Y.

[73] Assignee: General Electric Company, Pittsfield, Mass.

[21] Appl. No.: 955,078

[22] Filed: Oct. 1, 1992

[51] Int. Cl.⁵ .................................................. C08K 5/15
[52] U.S. Cl. ..................................... 524/114; 524/265; 524/267; 524/269; 525/67; 525/464
[58] Field of Search ............... 524/114, 265, 267, 269; 525/67, 464

[56] References Cited

U.S. PATENT DOCUMENTS

| | | | |
|---|---|---|---|
| 4,279,717 | 7/1981 | Eckberg et al. | 528/13 |
| 5,162,423 | 11/1992 | Neumann et al. | 525/67 |

*Primary Examiner*—Joseph L. Schofer
*Assistant Examiner*—Peter D. Mulcahy

[57] ABSTRACT

A thermoplastic composition is provided comprising an acrylonitrile-butadiene-styrene graft copolymer, polycarbonate and an epoxy functional silicone. The compositions exhibit reduced gloss and enhanced low temperature impact strengths and are useful as molding resins.

20 Claims, No Drawings

LOW GLOSS THERMOPLASTIC MOLDING COMPOSITIONS

BACKGROUND OF THE INVENTION

1. Field of the Invention

The present invention relates to thermoplastic molding compositions having an inherent matte or low gloss surface finish. The compositions are impact resistant alloys of polycarbonate and acrylonitrile-butadiene-styrene graft (ABS) polymers.

2. Description of the Related Art

Many thermoplastics have a natural, high gloss finish when injection molded, particularly compositions containing styrenic polymers such as emulsion ABS polymers. For many applications, high gloss is a very desirable characteristic and it may be one of the most important factors in the selection of the material. On the other hand, for many other products, such as automotive and business equipment, for example computer and other electronic equipment, there is a trend toward matte or low gloss finishes, principally for aesthetic reasons.

One technique for obtaining low gloss is to use a textured mold surface. Textured molds are even used to mold low gloss materials in order to further accentuate the dull finish. Using a high gloss product in a textured mold does not provide optimum results because the parts are not uniform over a long run. The mold surface tends to pick up material in different areas resulting in varying degrees of gloss over the surface of the parts.

Some polymers, like polypropylene, naturally exhibit less gloss than other thermoplastic polymers. Other polymers can easily be made to exhibit low gloss by the introduction of one or more additional constituents. An example of such a polymer is high impact polystyrene which is made by mixing polybutadiene with polystyrene. The large domains of rubber within the polystyrene phase result in a low gloss material. Still another inherently low gloss thermoplastic is ABS graft polymer made by the bulk polymerization process. The latter process involves the dissolving of polybutadiene in styrene monomer and the subsequent graft reaction between the styrene and the polybutadiene together with acrylonitrile monomer. At the end of the reaction, relatively large particles of rubber are created which may contain some occluded styrene-acrylonitrile copolymer. The large particle size of these rubbery domains are believed to be responsible for the low gloss surface finish of such products.

Approaches to obtaining low gloss for materials which naturally exhibit high gloss include functionalizing the butadiene or butadiene/styrene backbone or substrate onto which the other monomers are grafted. U.S. Pat. No. 4,612,347, for example, describes an acid functionalized graft copolymer. Other methods copolymerize a glycidyl ester with acrylonitrile, a vinyl and a rubbery copolymer as described in Japanese Kokai No. 63-156847. U.S. Pat. No. 4,710,534 suggests the use of an olefin rubber in combination with ABS in a polycarbonate or polycarbonate/polybutalene terephalate blend. U.S. Pat. Nos. 4,677,162, 4,624,986 and 4,526,926 all achieve low gloss by using mass or bulk polymerized ABS. U.S. Pat. No. 4,761,463 describes the use of vinyl compounds containing glycidyl esters of unsaturated acids for low gloss surfaces and U.S. Pat. No. 4,554,316 uses epoxy and acid (anhydride) functional olefins for the same purpose.

Low gloss resin compositions have been obtained by incorporation of a polyepoxide into blends of polycarbonate and ABS graft polymers, see Jalbert et al U.S. Pat. 5,026,777 which is incorporated herein by reference.

While there has been a desire to reduce the gloss of many polycarbonate/ABS resin blends, there has also frequently been a desire to improve the low temperature impact strengths of such blends.

SUMMARY OF THE INVENTION

The present invention is directed to a low gloss resin composition in which the reduced gloss and improved low temperature impact strength is achieved by the incorporation of a poly epoxy functional silicone into an ABS graft polymer/polycarbonate resin/styrene-acrylonitrile copolymer blend composition. While the mechanism is not fully understood, it is believed that a reaction takes place between the epoxy groups of the poly epoxy functional silicone and the styrene-acrylonitrile copolymer, by a mechanism known as the Ritter Reaction which allows the silicone fluid to form a gel with the styrene-acrylonitrile copolymers, which may allow the formation of small domains of crosslinked silicone which can function like a rubber. The compositions exhibit reduced gloss and improved low temperature impact strengths over similar compositions lacking the polyepoxy functional silicone.

DETAILED DESCRIPTION OF THE INVENTION

The thermoplastic molding compositions of the invention comprise a blend of a polycarbonate resin, an ABS graft polymer, and gloss reducing amounts of an epoxy functional silicone. The epoxy functional silicone fluid enhances the low temperature impact strength of the composition. The epoxy functionality of the silicone fluid reduces problems such as juicing and blooming which can be experienced by non-functionalized silicone fluids in polycarbonate/ABS graft polymer blends.

The graft polymer component which is included in the present compositions comprises rubber modified graft copolymers, the molecules of which contain two or more polymeric parts of different composition, namely a rubber substrate and a graft part, that are bonded chemically. The graft copolymer is preferably prepared by polymerizing a conjugated diene, such as butadiene, or a conjugated diene with a monomer copolymerizable therewith, such as styrene, to provide a rubber particle substrate. After formation of the rubber substrate, at least one grafting monomer, and preferably two, are polymerized in the presence of the prepolymerized particle substrate to obtain the graft copolymer. The graft copolymers are preferably prepared by emulsion grafting methods well known in the art.

The specific conjugated diene monomers normally utilized in preparing the rubber substrate of the graft polymer are generically described by the following formula:

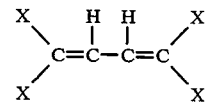

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is butadiene.

Optionally, the rubber substrate may be an acrylate rubber, such as one based on n-butyl acrylate, ethylacrylate, 2-ethylhexylacrylate, and the like. Additionally, minor amounts of a diene may be copolymerized in the acrylate rubber substrate to yield improved grafting with the matrix polymer. These resins are well known in the art and many are commercially available.

The rubber substrate, as mentioned, is preferably a conjugated diene polymer such polybutadiene, polyisoprene, or a copolymer, such as butadiene-styrene, butadiene-acrylonitrile, or the like.

One monomer or group of monomers that may be polymerized in the presence of the prepolymerized backbone to form the graft portion of the graft copolymer include monovinylaromatic compounds. The monovinylaromatic monomers utilized are generically described by the following formula:

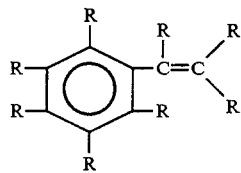

wherein R is selected from the group consisting of hydrogen, alkyl groups of 1 to 5 carbon atoms, cycloalkyl, aryl, alkaryl, aralkyl, alkoxy, aryloxy, and halogens. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylaromatic monomers used are styrene and/or α-methylstyrene.

A second group of monomers that may be polymerized in the presence of the prepolymerized rubber substrate to form the graft portion of the graft copolymer include acrylic monomers such as acrylonitrile, substituted acrylonitrile, and/or acrylic acid esters, for example alkyl acrylates such as methyl methacrylate.

The acrylonitrile, substituted acrylonitrile, or acrylic acid esters are described generically by the following formula:

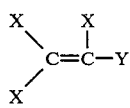

wherein X is as previously defined and Y is selected from the group consisting of cyano and carbalkoxy groups wherein the alkoxy group of the carbalkoxy contains from one to about twelve carbon atoms. Examples of such monomers include acrylonitrile, ethacrylonitrile, methacrylonitrile, α-chloroacrylonitrile, β-chloroacrylonitrile, α-bromoacrylonitrile, α-bromoacrylonitrile, methyl acrylate, methyl methacrylate, ethyl acrylate, butyl acrylate, propylacrylate, isopropyl acrylate and mixtures thereof. The preferred acrylonitrile monomer is acrylonitrile and the preferred acrylic acid esters are ethyl acrylate and methyl methacrylate. It is also preferred that the acrylic acid esters, when included, are employed in combination with acrylonitrile.

In the preparation of the graft copolymer, the conjugated diolefin polymer or copolymer exemplified by a 1,3-butadiene polymer or copolymer preferably comprises at least about 50% by weight, and more preferably at least about 70% by weight, and up to about 80% by weight, of the total graft copolymer. The monomers polymerized in the presence of the rubber substrate, exemplified by styrene and acrylonitrile, preferably comprise from about 20 to about 50% by weight of the total graft copolymer. It is additionally preferred that the second group of grafting monomers, exemplified by acrylonitrile, ethyl acrylate and methyl methacrylate, comprise from about 10% to about 40% by weight of the grafted portion of the graft copolymer while the monovinylaromatic hydrocarbon monomers, exemplified by styrene, comprise from about 60 to about 90% by weight of the graft portion of the graft copolymer.

In preparing the graft copolymer, it is normal to have a certain percentage of the polymerizing monomers combine with each other and occur as non-grafted rigid copolymer. If styrene is utilized as one grafting monomer and acrylonitrile is the second grafting monomer, a certain portion of the composition will copolymerize as free styrene-acrylonitrile copolymer. Similarly, in the case where α-methylstyrene (or another monomer) is substituted for the styrene in the composition used in preparing the graft polymer, a certain percentage of the composition may be an α-methylstyrene-acrylonitrile copolymer.

Also, there are occasions where a rigid polymer or copolymer, such as α-methylstyrene-acrylonitrile copolymer may be added to the graft copolymer by mechanical blending. The rigid polymers and copolymers which may be so added may be based on one or more of the following: monovinylaromatic compounds, methacrylic acid esters of $C_1$–$C_4$ aliphatic alcohols, acrylonitrile, substituted acrylonitrile and imidized maleic anhydride derivatives which are unsubstituted or substituted with an alkyl or aryl group. Examples of these rigid copolymers which may be added to the graft copolymer include polymethylmethacrylate (PMMA), copolymers of methyl methacrylate with one or more of the $C_1$–$C_4$ acrylates, styrene, α-methylstyrene and/or acrylonitrile, and the like. Such rigid copolymers may be prepared by emulsion, bulk, suspension, bulk-suspension or solution polymerization methods which are well known in the art.

In a preferred embodiment of the invention the graft copolymer is an acrylonitrile-butadiene-styrene graft copolymer (ABS resin), wherein the ABS resin contains at least 70 wt % of the diene rubber backbone and little or no free rigid polymers or copolymers are included in the molding composition. In an alternative preferred embodiment, the ABS resin contains at least 50 wt % of the diene rubber backbone and at least a small amount of rigid polymers or copolymers are included in the molding composition.

The present compositions also contain a polycarbonate component. Polycarbonates may be derived from the reaction of carbonic acid derivatives with aromatic, aliphatic, or mixed diols. They may be produced by the reaction of phosgene with a diol in the presence of an appropriate hydrogen chloride receptor or by a melt transesterification reaction between the diol and a carbonate ester. Polycarbonate can be made from a wide variety of starting materials, however, the principal polycarbonate produced commercially and preferred herein is bisphenol A polycarbonate, a polycarbonate made by reacting bisphenol A with phosgene by condensation. Also preferred are blends of bisphenol A polycarbonate with homopolymers and/or copolymers of brominated bisphenol A polycarbonate.

For a more complete discussion of the chemistry of polycarbonates, one may refer to Kirk-Othmer Encyclopedia of Chemical Technology, Third Edition (1982) Vol. 18, pp. 479–494. This article, by D. W. Fox, is incorporated by reference in its entirety.

The present compositions also contain an epoxy functional silicone polymer. Suitable epoxy functionalized silicones and methods for making them are described in Eckberg, et al, U.S. Pat. No. 4,279,717 which is incorporated herein by reference.

Suitable epoxy functional silicones include those of the formula:

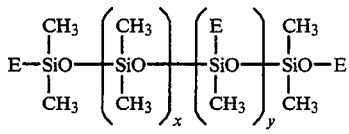

wherein E is an epoxy functional group; x is preferably selected from between 4 and 200, more preferably from 20 to 100, and most preferably from 40 to 80, and y is preferably from 0 to 20, more preferably from i to 10, and most preferably from 2 to 8. The above formula is meant to represent both random and block copolymers.

Suitable epoxy functional silicones include polydialkyl-alkyl epoxy siloxane copolymers having the following moeities:

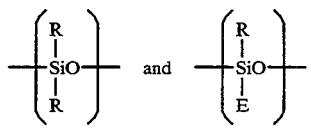

wherein E is an epoxy functional group and each R is an alkyl group having from 1 to 10 carbon atoms, and preferably E is of the formula:

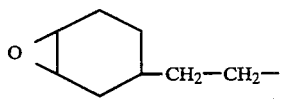

and preferably each R is a methyl group,

The epoxy functional silicones may be in the form of epoxy functional polydiorganosiloxane silicone fluids which are more preferably dialkylepoxy chainstopped polydialkyl-alkylepoxysiloxane copolymers wherein the polysiloxane units contain lower alkyl substituents, notably, methyl groups. The epoxy functionality is obtained when hydrogen atoms bonded to silicon on the polysiloxane chain of a polydimethyl-methylhydrogensiloxane copolymer are reacted in a hydrosilation addition reaction with organic molecules which contain both ethylenic unsaturation and epoxide functionality. Ethylenically unsaturated species will add to a polyhydroalkylsiloxane to form an organofunctional silicone in the presence of catalytic amounts of group VIII precious metal hydrosilation catalysts.

The epoxy functional silicone fluid may comprise an epoxy functional dialkyl epoxy chainstopped polydialkyl-alkyl epoxy siloxane copolymer silicone fluid which itself is the reaction product of a vinyl- or allylic-functional epoxide and a vinyl functional siloxane cross-linking fluid having a viscosity of approximately 1 to 100,000 centipoise at 25° C. with an Si-H-functional siloxane precursor fluid having a viscosity of approximately 1 to 10,000 centipoise at 25° C. in the presence of an effective amount of precious metal catalyst for facilitating a hydrosilation reaction of the vinyl functional cross-linking fluid and vinyl functional epoxide with the hydrogen functional siloxane precursor fluid.

The vinyl- or allylic-functional epoxide may be a cycloaliphatic epoxy compound such as 4-vinylcyclohexeneoxide, vinylnorbornenemonoxide, dicyclopentadienemonoxide, and allylglycidyl ether.

The precious metal catalyst can be selected from the group of platinum-metal complexes which includes complexes of ruthenium, rhodium, palladium, osmium, iridium and platinum.

The vinyl functional siloxane fluid can be selected from the group consisting of dimethylvinyl chain-stopped linear polydimethylsiloxane, dimethylvinyl chain-stopped polydimethyl-methylvinyl siloxane copolymer, tetravinyltetramethylcyclotetrasiloxane and tetramethyldivinyldisiloxane. The hydrogen functional siloxane precursor fluid can be selected from the group consisting of tetrahydrotetramethylcyclotetrasiloxane, dimethylhydrogen chain-stopped linear polydimethylsiloxeane, dimethylhydrogen chain-stopped polydimethyl-methyl-hydrogen siloxane copolymer and tetramethyldihydrodisiloxane.

The compositions of the present invention utilize epoxy functional silicone fluids which can be prepared in several ways. Epoxy compounds such as 4-vinylcyclohexeneoxide, depicted by the following formula,

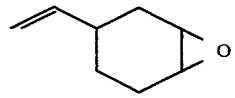

can be combined with Si-H functional polysiloxanes. An addition cure reaction also known as a hydrosilation can take place between the vinyl functional groups and the Si-H groups. It should be understood that the Si-H-containing silicone composition may have undergone an amount of "pre-crosslinking" before it is reacted with the olefin epoxide, such as taught by Eckberg, U.S. Pat. No. 4,987,158.

The epoxy functional silicones can be prepared from other vinyl- or allylic-functional epoxy compounds containing olefinic moieties such as allylglycidylether or glycidyl acrylate, vinylnorbornene monoxide and dicyclopentadiene monoxide. Although cyclohexyl epoxy compounds are particularly useful, other vinyl-functional epoxy compounds may also be used without significantly altering the properties of the product.

The compositions of the invention preferably contain the epoxy functional silicone constituent in an amount sufficient to enhance the matte finish of the blends. In preferred embodiments, the compositions contain from about 0.01 to about 5 weight percent of the epoxy functional silicone, and more preferably from about 0.1 to about 2 weight percent of the epoxy functional silicone, based on the weight of the composition. The compositions may also include conventional additives such as antioxidants, lubricants, pigments, phosphates, halogenated fire retardant additives and the like. The blend of graft copolymer and polycarbonate preferably comprises from about 5 to about 95 weight percent polycarbonate and from about 95 to about 5 weight percent graft copolymer based on the total weight of the blend. More preferably, the blend comprises from about 50 to about 95 weight percent polycarbonate and about 50 to about 5 weight percent graft copolymer. If the blend also includes a free rigid polymer or copolymer, it is preferred that the blend contains from about 10 to about 95 weight percent polycarbonate, from about 3 to about 45 weight percent graft and up to about 55 weight percent of the free rigid polymer or copolymer.

The compositions of the present invention preferably comprise an aromatic polycarbonate resin at a level of from 5 to 95 percent by weight based on the total weight of the composition, more preferably from 50 to 80 percent by weight thereof, as most preferably from 60 to 70 percent by weight thereof; preferably the rigid copolymer of vinyl aromatic monomer and vinyl cyanide monomer is present at a level of from 5 to 40 weight percent based on the total weight percent thereof; preferably the graft copolymer is present at a level of from 5 to 40 weight percent based on the total weight of the composition, more preferably from 10 to 30 weight percent thereof, and most preferably from 10 to 20 weight percent thereof; preferably the epoxy functional silicone is present at a level of from 1 to 20 weight percent based on the total weight of the composition, more preferably from 2 to 10 weight present thereof, and most preferably from 3 to 7 weight percent thereof.

The following examples illustrate the present invention but are not meant to limit the scope thereof. Example A is a comparative example. Example 1 illustrates the present invention. Note that the composition of example 1 has greater throughput at reduced torque than does comparative example A. Note the improved Izod impact strength at −40° C. and −60° C. of example 1 over comparative example A. Note also the reduced gloss of example I over comparative example A.

TABLE 1

|  | A | 1 |
| --- | --- | --- |
| PC | 64 | 64 |
| SAN | 20 | 20 |
| ABS-1 | 16 | 16 |
| EFS | 0 | 5 |
| Throughput (#/hr)/Torque | 24/94% | 35/<70% |
| Izod 23° C. (ft.-lb./in) | 13.0 | 12.8 |
| Izod −20° C. | 13.0 | 9.6 |
| Izod −40° C. | 3.4 | 8.5 |
| Izod −60° C. | 2.5 | 7.5 |
| % Tensile Elongation | 180% | 134% |
| 60° Gloss | 84.5 | 28.3 |

PC-1 is an aromatic polycarbonate obtained from the reaction of bisphenol A and phosgene.

SAN-1 is a styrene–acrylonitrile copolymer having 75 weight percent styrene and 25 weight percent acrylonitrile based on the total weight of the copolymer.

ABS-1 is a high rubber graft acrylonitrile-styrene-butadiene graft copolymer comprising 50 weight percent butadiene based on the total weight of the ABS-1, and having grafted thereon styrne-acrylonitrile rigid polymer having a 75:25 weight ratio of styrene acrylonitrile.

EFS is an epoxy functional silicone of the formula:

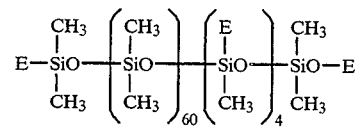

wherein E is an epoxy functional group of the formula

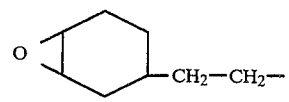

We claim:
1. A low-gloss thermoplastic composition having enhanced low temperature Izod impact strength, said composition comprising
 a) an aromatic carbonate polymer;
 b) a graft copolymer comprising a rigid phase grafted to a rubbery phase, said rubbery phase being selected from the group consisting of conjugated diene rubbers and alkyl acrylate rubbers, said rubbery phase having a glass transition temperature below 0° C., said rigid phase being selected from the group consisting of vinyl aromatic monomers, vinyl cyanide monomers, allyl acrylate monomers, and mixtures thereof; and
 c) an effective gloss-reducing amount of an epoxy functional silicone.

2. The composition of claim 1 wherein said composition further comprises a rigid copolymer of a vinyl aromatic monomer and a vinyl cyanide monomer.

3. The composition of claim 2 wherein said rigid copolymer is a styrene-acrylonitrile copolymer.

4. A resin composition comprising
 a) an aromatic polycarbonate resin present at a level of from 5 to 95 weight percent based on the total weight of the composition;
 b) a graft copolymer comprising a rubbery phase and a rigid phase, said rubbery phase being selected from the group consisting of diene rubbers, said rigid phase being selected from the group consisting of polymers of vinyl aromatic monomers, vinyl cyanide monomers, and methylmethacrylate monomers, said rubbery phase having a glass transition temperature of less than 0° C., said graft copolymer being present at a level of from 5 to 95 weight percent based on the total weight of the composition;
 c) a rigid copolymer of a vinyl aromatic monomer and a vinyl cyanide monomer, said rigid copolymer being present at a level of from 5 to 40 percent by weight based on the total weight of the composition; and
 d) an epoxy functional silicone present at a level of from 1 to 20 percent by weight based on the total weight of the composition, said epoxy functional silicone being present at an effective gloss reducing level.

5. The composition of claim 4 wherein said epoxy functional silicone has moieties of the formulas:

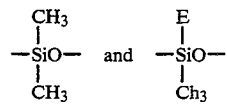

wherein E is an epoxy functional group.

6. The composition of claim 5 wherein the epoxy functional silicone is represented by the formula:

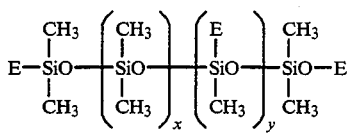

wherein x is selected from between 4 and 200 and y is selected from between 2 and 8.

7. The composition of claim 6 wherein said polycarbonate is present at a level of from 50 to 80 percent by weight, said graft polymer is present at a level of from 10 to 30 percent by weight, said rigid copolymer is present at a level of from 10 to 30 percent by weight, said epoxy functional silicone is present at a level of from 2 to 10 percent by weight.

8. The composition of claim 1, wherein said graft copolymer comprises acrylonitrile-butadiene-styrene graft copolymer.

9. The composition of claim 8, wherein said acrylonitrile-butadiene styrene graft copolymer contains at least 70 weight percent of the diene rubber backbone and little or no free rigid polymers or copolymers.

10. The composition of claim 8, wherein said acrylonitrile-butadiene styrene graft copolymer contains at least 50 weight percent of the diene rubber backbone and at least a small amount of rigid polymer or copolymer.

11. The composition of claim 5, wherein the epoxy functional silicone is represented by the formula:

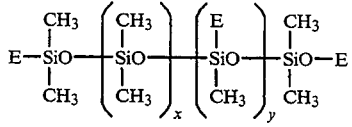

wherein x ranges from 20 to 100, and y ranges from 0 to 20.

12. The composition of claim 11, wherein x ranges from 40 to 80 and y ranges from 1 to 10.

13. The composition of claim 11, wherein x is 60 and y is 4.

14. The composition of claim 11, wherein E is an epoxy group of the formula:

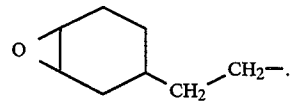

15. The composition of claim 1, wherein the amount of said epoxy functional silicone ranges from about 0.01 to about 5 weight percent.

16. The composition of claim 15, wherein the amount of said epoxy functional silicone ranges from about 0.1 to about 2 weight percent.

17. The composition of claim 1 further comprising an additive of selected from the group consisting of antioxidants, lubricants, pigments, phosphates, and halogenated fire retardant additives.

18. The composition of claim 17, wherein said additive comprises phosphates or halogenated fire retardant additives.

19. A low-gloss thermoplastic composition having enhanced low temperature izod impact strength, said composition consisting essentially of:
(a) an aromatic carbonate polymer;
(b) a graft copolymer comprising a rigid phase grafted to a rubbery phase, said rubbery phase being selected from the group consisting of conjugated diene rubbers and alkyl acrylate rubbers, said rubbery phase having a glass transition temperature below 0° C., said rigid phase being selected from the group consisting of vinyl aromatic monomers, vinyl cyanide monomers, allyl acrylate monomers and mixtures thereof;
(c) an effective gloss-reducing amount of an epoxy functional silicone.

20. The composition of claim 1, wherein the Gardner gloss at 60° for said composition is less than 28.3.

* * * * *